(12) United States Patent
Deng et al.

(10) Patent No.: US 9,977,986 B2
(45) Date of Patent: May 22, 2018

(54) METHOD AND APPARATUS FOR SWITCHING A REGION OF INTEREST

(71) Applicant: STREAMAX TECHNOLOGY CO., LTD., Shenzhen (CN)

(72) Inventors: Baohua Deng, Shenzhen (CN); Wentao Liu, Shenzhen (CN)

(73) Assignee: STREAMAX TECHNOLOGY CO, LTD., Shenzhen (CN)

( * ) Notice: Subject to any disclaimer, the term of this patent is extended or adjusted under 35 U.S.C. 154(b) by 0 days. days.

(21) Appl. No.: 15/323,911

(22) PCT Filed: Nov. 19, 2015

(86) PCT No.: PCT/CN2015/095052
§ 371 (c)(1),
(2) Date: Jan. 4, 2017

(87) PCT Pub. No.: WO2017/084075
PCT Pub. Date: May 26, 2017

(65) Prior Publication Data
US 2017/0308769 A1    Oct. 26, 2017

(51) Int. Cl.
*H04N 5/235* (2006.01)
*G06K 9/46* (2006.01)
*G06T 7/11* (2017.01)

(52) U.S. Cl.
CPC .............. *G06K 9/4661* (2013.01); *G06T 7/11* (2017.01); *H04N 5/2351* (2013.01)

(58) Field of Classification Search
CPC .................................................... H04N 5/2351
USPC ..................................................... 348/222.1
See application file for complete search history.

(56) References Cited

U.S. PATENT DOCUMENTS

2007/0132864 A1* 6/2007 Tsuruoka ............... H04N 5/357
348/241

* cited by examiner

*Primary Examiner* — Joel Fosselman
(74) *Attorney, Agent, or Firm* — Buchanan Ingersoll & Rooney PC

(57) ABSTRACT

A method of vehicle monitoring includes: obtaining a frame of an image before exposure; outputting a luminance value of each partition of the image, accumulation number of pixels lower than a first set threshold, accumulation number of pixels higher than a second set threshold, to generate an evaluation data; generating eigenvalues of a plurality of illuminance evaluation areas based on the evaluation data and the preset illuminance evaluation area distribution table; estimating the illuminance of an environment of a vehicle according to the eigenvalues of the plurality of illuminance evaluation areas and differentiation characteristics between normal illuminance and low illuminance; switching the region of interest of a current exposing image based on the estimating results, generating a weight table based on the content of the current exposing image and the switched region of interest, controlling the exposing of the region of interest based on the weight table.

10 Claims, 4 Drawing Sheets

METHOD AND APPARATUS FOR SWITCHING A REGION OF INTEREST

TECHNICAL FIELD

The present invention belongs to the field of vehicle monitoring, particularly to a method and an apparatus for switching a region of interest.

BACKGROUND

With the popularity of on-board front imaging equipment, many vehicles are equipped with on-board front imaging equipment. The equipment is usually installed inside a car and outward, located in the front of the car, with a driving recorder function which can be used to monitor the road condition around the car during driving, and record all the images along the forward direction of the car. The main purpose of the equipment is obtaining evidences effectively when a traffic accident occurs, at the same time, the equipment can be used to record the beautiful scenery and the driving trajectory along the way. In addition, the equipment can also provide reliable data for intelligent algorithms such as on-road parking capture, algorithm of license recognition and so on.

However, the present on-board front imaging equipment is susceptible to illumination, which can't avoid overexposing or underexposing of the region of interest on the premise of ensuring the clarity of the overall image, and narrowing the scope of application, and it's not conducive to the promotion of on-board front imaging equipment. This is because the present equipment is usually use single-point evaluation or overall evaluation as the method used to evaluate the region of interest, to guarantee clarity of the overall image will induce the situation of overexposing or underexposing of the region of interest, it's difficult for the present equipment to adapt to the special requirements for intelligent algorithms under any illumination or scene outside the car, for example, it's easy overexposing local part of the image in the midday sun and underexposing the areas beside the car in low light, therefore the scope of application is narrow, which is not conducive to the promotion of on-board front imaging equipment.

SUMMARY

The present invention aims at providing a method of switching a region of interest, to solve the problem that the existing on-board front imaging equipment is susceptible to illumination, which can't avoid overexposing or underexposing of the region of interest on the premise of ensuring the overall image is clear, and narrowing the scope of application, which is not conducive to the promotion of on-board front imaging equipment.

The present invention provides a method of switching a region of interest, comprising:

obtaining a frame of an image before exposure;

outputting a luminance value of each partition of the image, the accumulation number of pixels lower than a first set threshold, accumulation number of pixels higher than a second set threshold, to generate an evaluation data;

generating eigenvalues of a plurality of illuminance evaluation areas based on the evaluation data and the preset illuminance evaluation area distribution table;

estimating an illuminance of a environment of the vehicle according to the eigenvalues of the plurality of illuminance evaluation areas and differentiation characteristics between normal illuminance and low illuminance;

switching the region of interest of a current exposing image based on the estimating results, generating a weight table based on the content of the current exposing image and the switched region of interest, controlling the exposing of the region of interest based on the weight table.

Another embodiment of the present invention is aimed to provide a region of interest switching apparatus, comprising:

an image obtaining module, which is used for obtaining a frame of an image before exposure;

an output obtaining module, which is used for outputting a luminance value of each partition of the image, the accumulation number of pixels lower than a first set threshold, accumulation number of pixels higher than a second set threshold, to generate an evaluation data;

an eigenvalue generating module, which is used for generating eigenvalues of a plurality of illuminance evaluation areas based on the evaluation data and the preset illuminance evaluation area distribution table;

an illuminance estimating module, which is used for estimating the illuminance of an environment of a vehicle according to the eigenvalues of the plurality of illuminance evaluation areas and differentiation characteristics between normal illuminance and low illuminance;

an exposing module, which is used for switching a region of interest of a current exposing image based on the estimating results, generating a weight table based on the content of the current exposing image and the switched region of interest, controlling the exposing of the region of interest based on the weight table.

In the embodiment of the present invention, the region of interest of the currently exposed image is switched based on the result of the estimation of the illuminance, and a weight table is generated based on the content of the currently exposed image and the switched region of interest, then controlling the exposing of the region of interest based on the weight table. In this way, the problems in the existing on-board front image equipment is solved, such as be susceptible to illumination, which can't avoid overexposing or underexposing of the region of interest on the premise of ensuring the clarity of the overall image, narrowing the scope of application, nor does it conducive to the promotion of on-board front imaging equipment. The invention has advantages of two aspects. On one hand, the region of interest of current exposing image is switched adaptively so as to highlight the details of the image partitions which the monitoring required area or the intelligent algorithm concerned about, make it conducive to the identification and abnormality determination. On the other hand, the apparatus can estimate the current environmental illumination in real time, switch to different region of interest according to the changing of illuminance, and get the average brightness of the automatic exposure by changing the weight subject through the weight table, avoid overexposing of the region of interest while the details are clear, make the brightness of the overall image meet the subjective needs of the human eyes.

DETAILED EMBODIMENTS

In order to make the objectives, technical solutions and advantages of the present disclosure more clear, embodiments of the present disclosure will be described in detail combining with the attached drawings. It should be understood that embodiments described here are intended to interpret the invention rather than limiting the invention.

Embodiment 1

Figure 1:
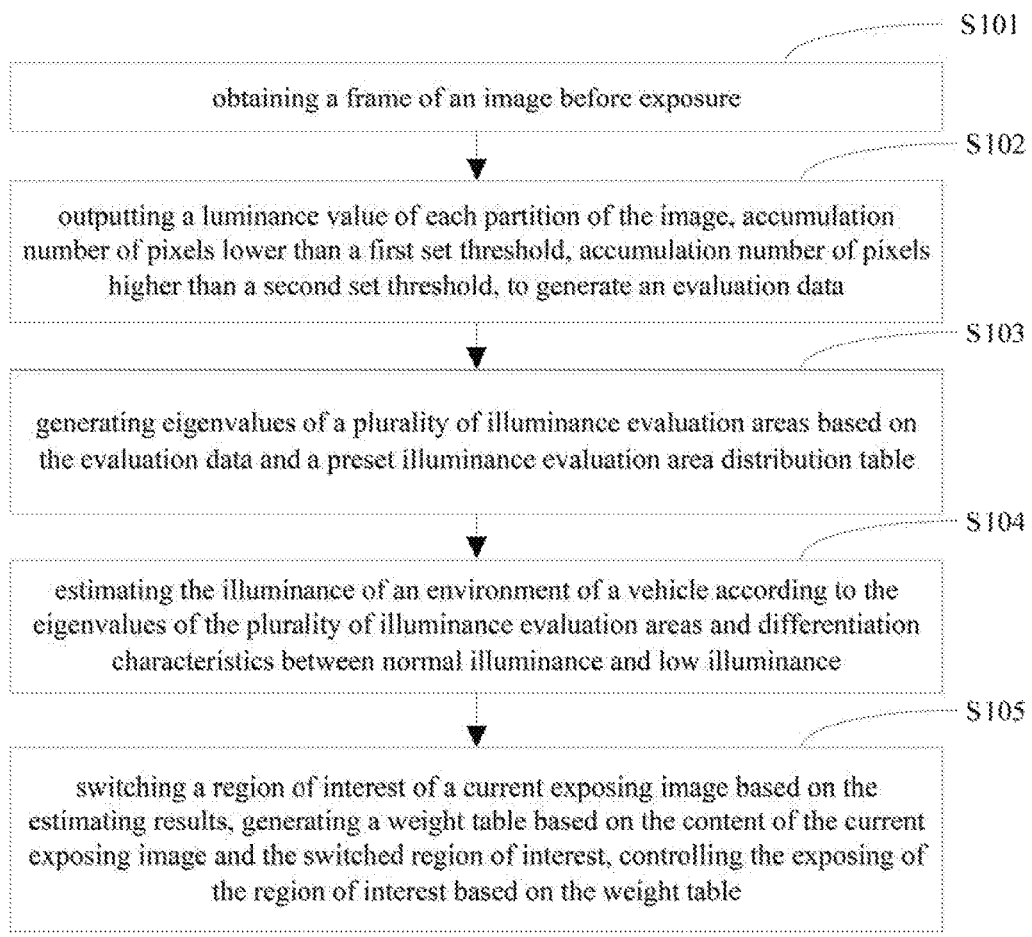
FIG. 1 is an implementation flow diagram of a method of switching a region of interest according to an embodiment of the present invention.

FIG. 1 is an implementation flow diagram of a method of switching a region of interest according to an embodiment of the present invention, detailed as follows:

In step S101, obtaining a frame of an image before exposure;

Step S101 specifically including:

during driving, obtaining the frame of an image previous to the current exposing image. In step S102, outputting a luminance value of each partition of the image, accumulation number of pixels lower than a first set threshold, accumulation number of pixels higher than the second set threshold, to generate an evaluation data;

in step S103, generating eigenvalues of a plurality of illuminance evaluation areas based on the evaluation data and the preset illuminance evaluation area distribution table;

wherein the step S103 specifically including:

presetting the distribution of the evaluation regions, and dividing the entire image into a plurality of areas;

selecting a preset number of areas as a plurality of illuminance evaluation regions;

counting and generating the eigenvalues of the plurality of illuminance evaluation regions on the basis of the evaluation data.

Wherein, the eigenvalues comprises at least one of luminance ratio and average brightness.

Wherein, counting and generating the eigenvalues of the plurality of illuminance evaluation regions on the basis of the evaluation data further including:

calculating the number of pixels which is higher than the first set threshold in each illuminance evaluation area, and generating a high-threshold illumination pixel accumulation number corresponding to each illuminance evaluation area;

calculating the number of pixels which is lower than the second set threshold in each illuminance evaluation area, and generating a low-threshold illumination pixel accumulation number corresponding to each illuminance evaluation area;

generating a brightness ratios corresponding to each illuminance evaluation area by dividing the high threshold illumination pixel accumulation number with the low threshold illumination pixel accumulation number of each illuminance evaluation area;

obtaining the pixel brightness of each illuminance evaluation area by the preset exposure gain, and the average brightness corresponding to each illuminance evaluation area is generated based on the pixel brightness and the pixels number.

Wherein, the first set threshold is different with the second set threshold.

In step S104, estimating the illuminance of an environment in which the vehicle is located according to the eigenvalues of the plurality of illuminance evaluation areas and differentiation characteristics between normal illuminance and low illuminance:

In step S105, switching a region of interest of a current exposing image based on the estimating results, generating a weight table based on the content of the current exposing image and the switched region of interest, controlling the exposing of the region of interest based on the weight table.

Wherein, step S105 further including:

switching the default region of interest into the region of interest corresponding to the estimation in the current exposing image based on the estimating results of the illuminance, assigning the weight value of the subject luminance evaluation of current exposing image based on the region of interest, and then generating a weight table, transforming the subject weight by the weighting table to obtain an average luminance of the automatic exposure, and controlling the exposure of the region of interest according to the average luminance.

Wherein, the region of interest includes but is not limited to the details of the image partitions which the monitoring required area and the intelligent algorithm are interested to.

The embodiment of the present invention is able to get the differentiated features between normal illumination and low illumination, and generate a different weight table to control exposure according to the real content of on-board image and the switching of different regions of interest under different illumination, so that the on-board image apparatus could meet the needs of traffic monitoring and intelligent algorithm under different illumination.

Embodiment 2

This embodiment describes the composition of a plurality of illumination evaluation areas, as detailed below:

the plurality of illuminance evaluation areas including a front-side area, an image central area, and both side areas of the vehicle.

Figure 2:
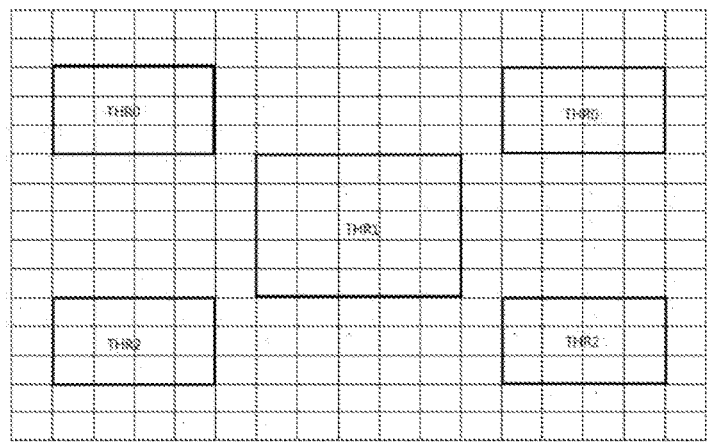
FIG. 2 is a diagram of a preferred example of a plurality of illuminance evaluation regions according to an embodiment of the present invention.

Referring to FIG. 2, which is a diagram of a preferred example of a plurality of illuminance evaluation regions according to an embodiment of the present invention;

Two THR0s located on the top, a THR1 located in the middle, and two THR2s located on the bottom are five representative regional sub-windows.

Wherein, THR0 represents the area in front, i.e., the area in front of the vehicle.

Wherein, THR1 represents the image central area.

Wherein, THR2 represents the both side areas of the vehicle.

Embodiment 2

Figure 3:
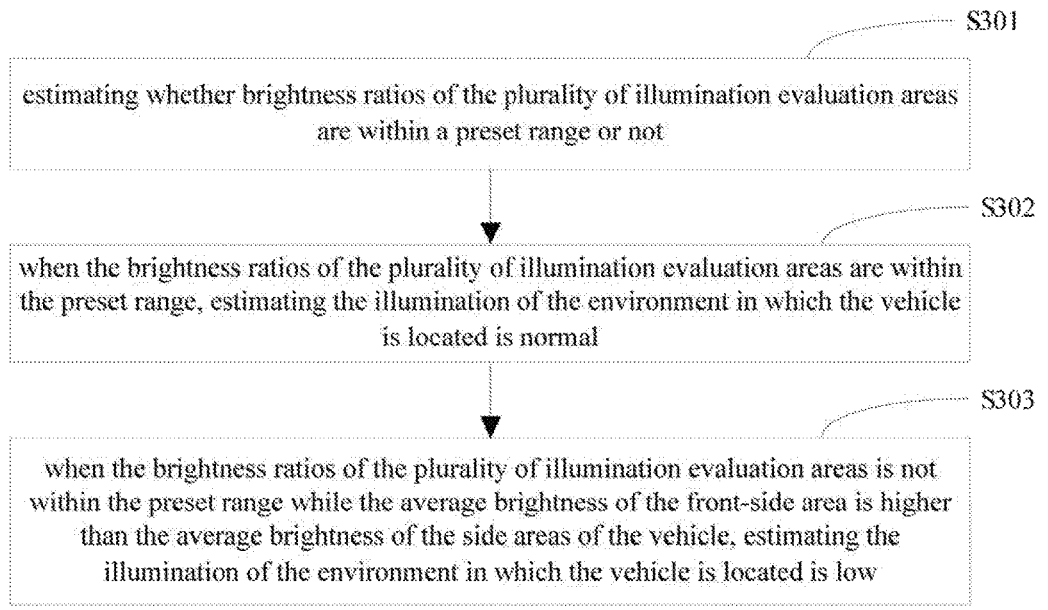
FIG. 3 is an implementation flow diagram of the step S104 of the method of switching a region of interest according to an embodiment of the present invention.

FIG. 3 is an implementation flow diagram of the step S104 of the method of switching a region of interest according to an embodiment of the present invention, as detailed below:

S301, estimating whether brightness ratios of the plurality of illumination evaluation areas are within a preset range or not;

S302, when the brightness ratios of the plurality of illumination evaluation areas are within the preset range, estimating the illumination of the environment in which the vehicle is located is normal;

S303, when the brightness ratios of the plurality of illumination evaluation areas is not within the preset range while the average brightness of the front-side area is higher than the average brightness of the side areas of the vehicle, estimating the illumination of the environment in which the vehicle is located is low;

wherein, the brightness ratios is the value of the high threshold illumination pixel accumulation number divided by the low threshold illumination pixel accumulation number;

wherein, the average brightness is the value of the pixels brightness divided by the pixels number.

Embodiment 4

Figure 4:
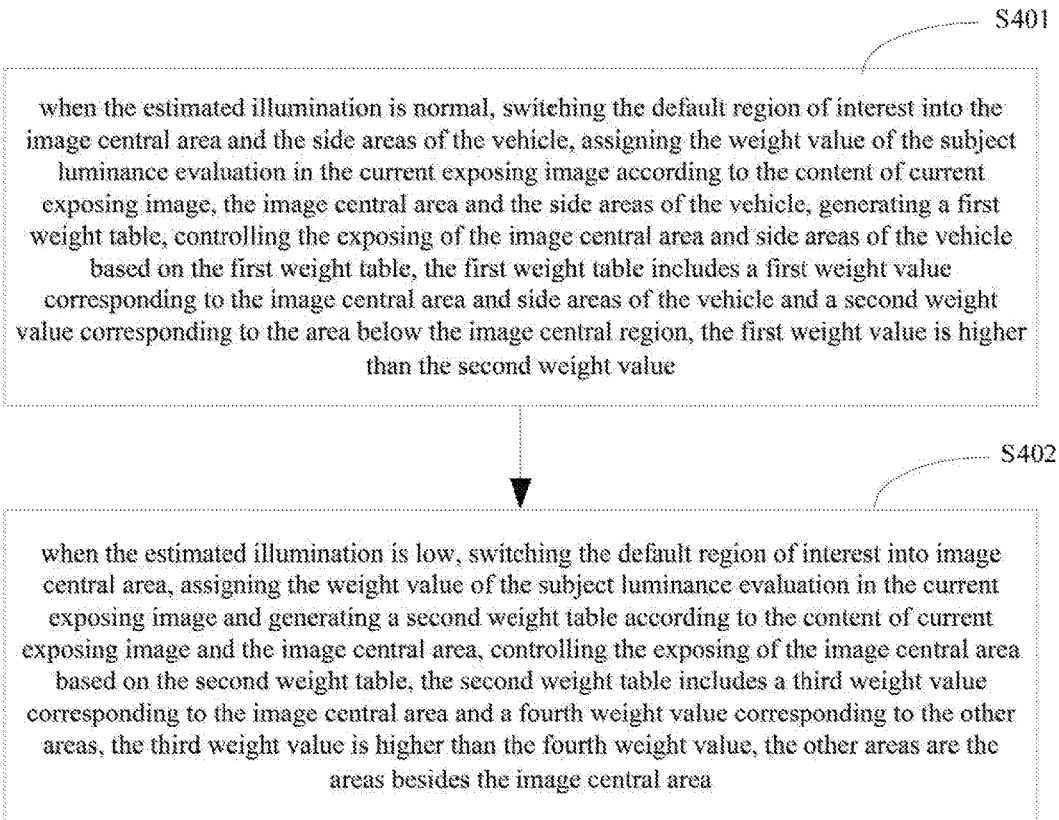
FIG. 4 is an implementation flow diagram of the step S105 of the method of switching a region of interest according to an embodiment of the present invention.

FIG. 4 is an implementation flow diagram of the step S105 of the method of switching a region of interest according to an embodiment of the present invention, as detailed below:

S401, when the estimated illumination is normal, switching the default region of interest into the image central area and the side areas of the vehicle, assigning the weight value of the subject luminance evaluation in the current exposing image according to the content of current exposing image, the image central area and the side areas of the vehicle, generating a first weight table, controlling the exposing of the image central area and side areas of the vehicle based on the first weight table, the first weight table includes a first weight value corresponding to the image central area and side areas of the vehicle and a second weight value corresponding to the area below the image central region, the first weight value is higher than the second weight value;

S402, when the estimated illumination is low, switching the default region of interest into image central area, assigning the weight value of the subject luminance evaluation in the current exposing image and generating a second weight table according to the content of current exposing image and the image central area, controlling the exposing of the image central area based on the second weight table, the second weight table includes a third weight value corresponding to the image central area and a fourth weight value corresponding to the other areas, the third weight value is higher than the fourth weight value, the other areas are the areas besides the image central area;

wherein, the first weight table includes a first weight value corresponding to the image central area and side areas of the vehicle and a second weight value corresponding to the area below the image central region, the first weight value is higher than the second weight value;

wherein, the second weight table includes a third weight value corresponding to the image central area and a fourth weight value corresponding to the other areas, the third weight value is higher than the fourth weight value, the other areas are the areas besides the image central area.

Figure 5:
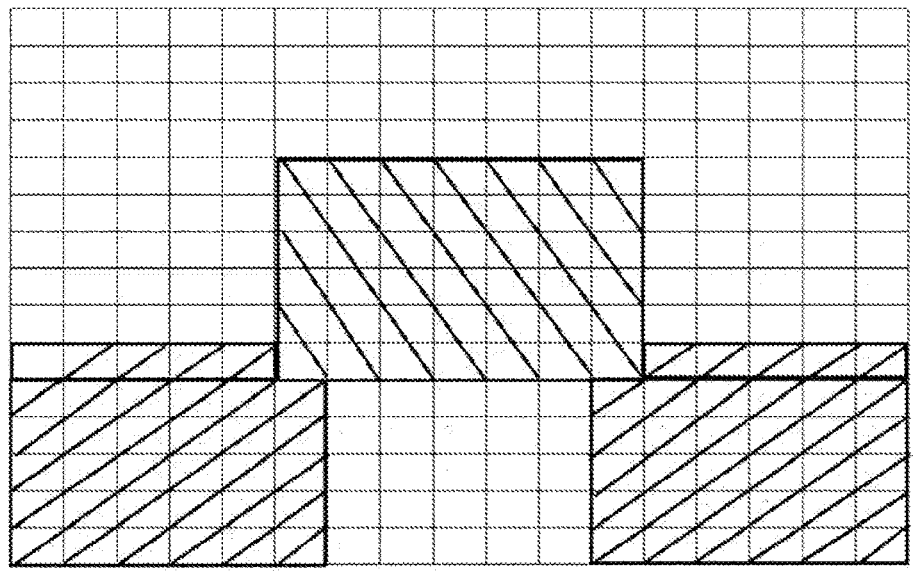
FIG. 5 is a diagram of a preferred example of a first weight table according to an embodiment of the present invention.

Referring to FIG. 5, which is a diagram of a preferred example of a first weight table according to an embodiment of the present invention.

Figure 6:
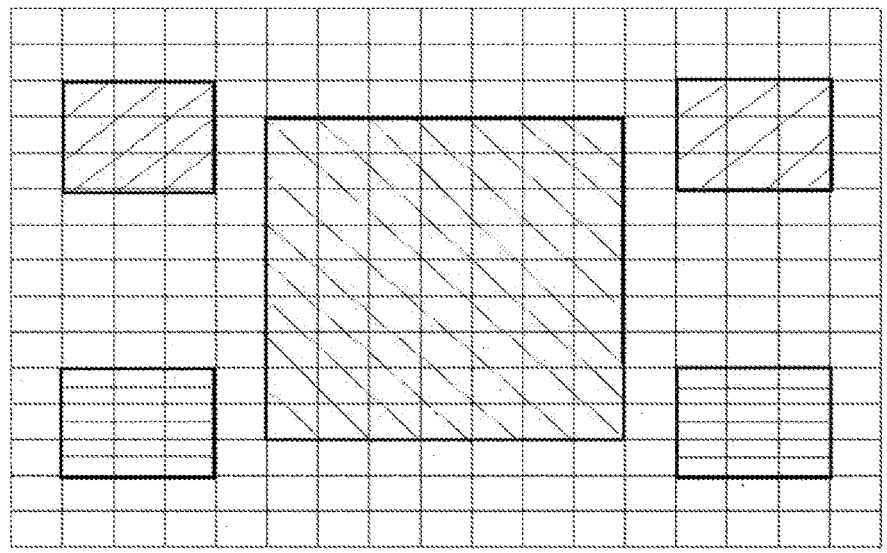
FIG. 6 is a diagram of a preferred example of a second weight table according to an embodiment of the present invention.

Referring to FIG. 6, which is a diagram of a preferred example of a second weight table according to an embodiment of the present invention.

Embodiment 5

Figure 7:
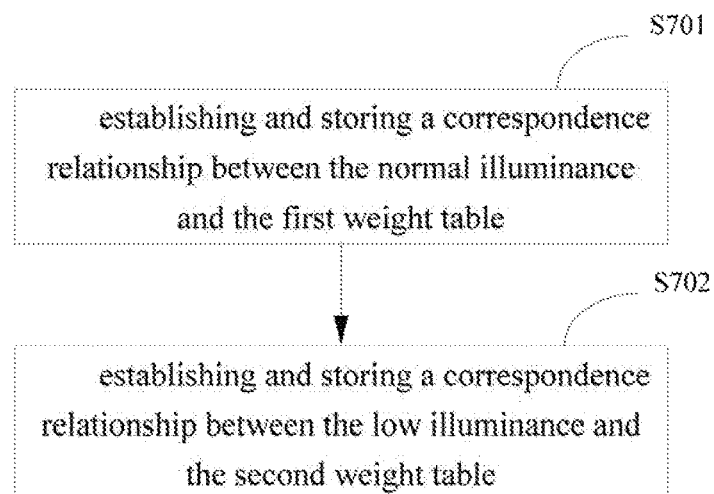
FIG. 7 is an implementation flow diagram of configuring the weight table according to an embodiment of the present invention.

FIG. 7 is an implementation flow diagram of configuring the weight table according to an embodiment of the present invention, as detailed below:

S701, establish and store a correspondence relationship between the normal illuminance and the first weight table.

S702, establish and store a correspondence relationship between the low illuminance and the second weight table.

Embodiment 6

This embodiment mainly describes a preferred implementation flow of a method of switching a region of interest in practical application, as detailed below:

1. As shown in FIG. 2, in order to reduce the cost of software operations, the entire image is divided into multiple sub-windows, and then five representative sub-windows are selected as the main basis for environmental estimation, the histogram data of each sub-window, the number and the luminance sums of pixels larger than THR0, the number and the luminance sums of the pixels less than THR1, and the average brightness of each evaluation window are counted by using the FPGA.

2. Definition and estimation of subject areas. The onboard monitoring cameras are usually installed under the front glass of the vehicle, which is used to monitor the situation of the road in front, so five sub-windows are defined to evaluate the subject areas which should be selected. As shown in FIG. 2, THR0 is on the top region of the image, the data collected by this region is usually corresponding to the sky, which is not actually concerned about, so its weight can be considerably weakened. Ranges in front of the vehicle and the both sides (as the locations of THR1 and THR2 shows) are the parts which are mainly monitored in the normal illumination, it is generally required to be able to take a clear picture showing the driving conditions of vehicles in front, including the license and the situation of whether the car is crossing the line or not, so the front region needs to be focused on considerably, the side regions of the vehicle are the secondary areas, which are mainly used in the situations of collision or accident disputation.

Based on this situation, weight table 1 is generated, the central areas and the both side areas of the vehicle are mainly exposed, the weight of the area below the central area can be reduced extremely for the reason that this area usually is the non-focus area of the lens and is unsuitable to be assigned with high weight so as not to affect estimating of the overall brightness of the image. In the situation of low luminance, the vehicle's distance light is turned on, the subject areas of the image brightness is in front of the vehicle, the light on both sides of the vehicle is actually the reflected light or side light leakage of the vehicle's headlight, as long as the front area are exposed properly, the brightness of the side areas can still be within the acceptable range, as shown in weight table 2, large region of the central area are exposed while the other four regions are given a relatively small weight to ensure that the central area is clear and the around areas are not too dark at the same time.

3. The eigenvalues of the method of switching a region of interest includes: the high threshold illumination pixel cumulated number CNTHR0, the low threshold illumination pixel cumulated number CNTL0, and the average brightness T' under unit exposure gain. R (CNTHR0/CNTL0) and T' are used to measure whether the current exposure is normal or not. When the ratio of each windows and T' are all within a certain range, estimating the situation is normal, and the subject weight is assigned through weight table 1 for exposing. If T' of the front area is much higher than T' of the side areas, and $R_{mid} > R_{top}$, $R_{mid} > R_{down}$ while both $R_{top}$ and $R_{down}$ are less than a certain threshold in a situation, which indicating that the environment luminance is low and an external supplementary lights are exist in front of the vehicle. In this situation, the weight table is switched to the weight table 2 and the weight table 2 is used in exposure, and the exposure compensation value is reduced appropriately, so as to prevent over-exposing of the front side.

Applying the algorithm of the present invention to an on-board front imaging equipment can make the exposure of the region of interest normal while the details of the region of interest which are required by the intelligent algorithm are more clearly. It can not only monitor the road situation as a driving recorder, but also can provide stable and reliable data for back-end intelligent algorithm, thus reduce the difficulty of intelligent algorithm.

Embodiment 7

Figure 8:
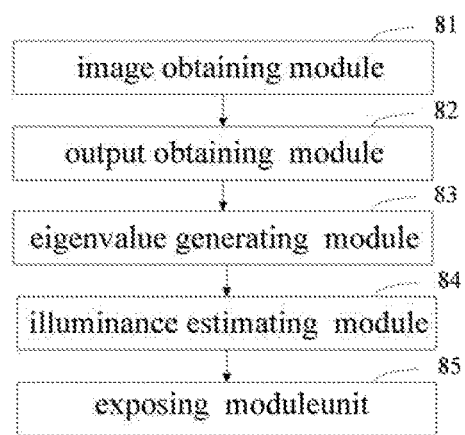
FIG. 8 is a block diagram of an apparatus of switching a region of interest according to the embodiment of the present invention.

FIG. 8 is a block diagram of an apparatus of switching a region of interest according to the embodiment of the present invention, the apparatus can be used in an on-board front imaging equipment. For convenience of explanation, only the parts related to the present embodiment are shown.

Referring to FIG. 8, the region of interest switching apparatus comprises: an image obtaining module 81, which is used for obtaining a frame of an image before exposure;

an output obtaining module 82, which is used for outputting a luminance value of each partition of the image, the accumulation number of pixels lower than a first set threshold, accumulation number of pixels higher than a second set threshold, to generate an evaluation data;

an eigenvalue generating module 83, which is used for generating eigenvalues of a plurality of illuminance evaluation areas based on the evaluation data and the preset illuminance evaluation area distribution table;

an illuminance estimating module 84, which is used for estimating the illuminance of an environment of a vehicle according to the eigenvalues of the plurality of illuminance evaluation areas and differentiation characteristics between normal illuminance and low illuminance;

an exposing module 85, which is used for switching a region of interest of a current exposing image based on the estimating results, generating a weight table based on the content of the current exposing image and the switched region of interest, controlling the exposing of the region of interest based on the weight table.

As an implementation of the present embodiment, wherein in the region of interest switching apparatus, the plurality of illuminance evaluation areas including a front-side area, an image central area, and both side areas of the vehicle.

As an implementation of the present embodiment, wherein in the region of interest switching apparatus, the illuminance estimating module further including:

an estimating unit, which is used for estimating whether brightness ratios of the plurality of illumination evaluation areas are within a preset range or not;

a normal illuminance estimating unit, which is used for estimating the illumination of the environment in which the vehicle is located is normal when the brightness ratios of the plurality of illumination evaluation areas are within the preset range;

a low illuminance exposing unit, which is used for estimating the illumination of the environment in which the vehicle located is low when the brightness ratios of the plurality of illumination evaluation areas is not within the preset range while the average brightness of the front-side area is higher than the average brightness of the side areas of the vehicle; wherein, the brightness ratios is the value of the high threshold illumination pixel accumulation number divided by the low threshold illumination pixel accumulation number, wherein, the average brightness is the value of the pixels brightness divided by the pixels number.

As an implementation of the present embodiment, wherein in the region of interest switching apparatus, the exposing module including:

a first exposing unit, which is used for switching the default region of interest into the image central area and the side areas of the vehicle when the estimated illumination is normal, and assigning the weight value of the subject luminance evaluation in the current exposing image according to the content of current exposing image, the image central area and the side areas of the vehicle, generating a first weight table, controlling the exposing of the image central area and side areas of the vehicle based on the first weight table, the first weight table includes a first weight value corresponding to the image central area and side areas of the vehicle and a second weight value corresponding to the area below the image central region, the first weight value is higher than the second weight value;

a second exposing unit, which is used for switching the default region of interest into image central area when the estimated illumination is low, and assigning the weight value of the subject luminance evaluation in the current exposing image and generating a second weight table according to the content of current exposing image and the image central area, controlling the exposing of the image central area based on the second weight table, the second weight table includes a third weight value corresponding to the image central area and a fourth weight value corresponding to the other areas, the third weight value is higher than the fourth weight value, the other areas are the areas besides the image central area;

wherein, the first weight table includes a first weight value corresponding to the image central area and side areas of the vehicle and a second weight value corresponding to the area below the image central region, the first weight value is higher than the second weight value;

wherein, the second weight table includes a third weight value corresponding to the image central area and a fourth weight value corresponding to the other areas, the third weight value is higher than the fourth weight value, the other areas are the areas besides the image central area.

As an implementation of the present embodiment, wherein in the region of interest switching apparatus, further including:

a first weight table configuring module, which is used for establishing and storing a correspondence relationship between the normal illuminance and the first weight table;

a second weight table configuring module, which is used for establishing and storing a correspondence relationship between the low illuminance and the second weight table.

The apparatus provided by the embodiments of the present invention can be applied to the corresponding method embodiments which are described above, the details are within reference to the above embodiments and won't be repeated here.

Based on the description of the embodiments above, it will be apparent to those skilled in the art that the present invention can be implemented by combining software and necessary generic hardware. The program can be stored in a readable storage medium, such as random access memory, flash memory, read only memory, programmable read only memory, electrically erasable programmable memory, registers, and the like. The storage medium is installed in a memory, the processor reads the information in the memory and performs the method described in the various embodiments of the present invention in combination with its hardware.

The above content is only the specific embodiment of the prevent invention, and the scope of the prevent invention is limited to these illustrations. The simple deductions or replacements made by those ordinary skilled person in the art without escaping from the conception of the prevent invention, should be regarded as falling into the protection scope of the present invention. The scope of the present invention is defined by the scope of the claims.

The invention claimed is:

1. A method of switching a region of interest, wherein the method comprising:
    obtaining a frame of an image before exposure;
    outputting a luminance value of each partition of the image, accumulation number of pixels lower than a first set threshold, accumulation number of pixels higher than a second set threshold, to generate an evaluation data;
    generating eigenvalues of a plurality of illuminance evaluation areas based on the evaluation data and a preset illuminance evaluation area distribution table;
    estimating the illuminance of an environment of a vehicle according to the eigenvalues of the plurality of illuminance evaluation areas and differentiation characteristics between normal illuminance and low illuminance;
    switching a region of interest of a current exposing image based on the estimating results, generating a weight table based on the content of the current exposing image and the switched region of interest, controlling the exposing of the region of interest based on the weight table.

2. The method of switching a region of interest according to claim 1, wherein the plurality of illuminance evaluation areas including a front-side area, an image central area, and both side areas of the vehicle.

3. The method of switching a region of interest according to claim 1, wherein the method of estimating the illuminance of an environment of a vehicle according to the eigenvalues of the plurality of illuminance evaluation areas and differentiation characteristics between normal illuminance and low illuminance including:
    estimating whether brightness ratios of the plurality of illumination evaluation areas are within a preset range or not;
    when the brightness ratios of the plurality of illumination evaluation areas are within the preset range, estimating the illumination of the environment in which the vehicle is located is normal;
    when the brightness ratios of the plurality of illumination evaluation areas is not within the preset range while the average brightness of the front-side area is higher than the average brightness of the side areas of the vehicle, estimating the illumination of the environment in which the vehicle is located is low,
    wherein, the brightness ratios is the value of the high threshold illumination pixel accumulation number divided by the low threshold illumination pixel accumulation number;
    wherein, the average brightness is the value of the pixels brightness divided by the pixels number.

4. The method of switching a region of interest according to claim 1,
    wherein the method of switching a region of interest of a current exposing image based on the estimating results, generating a weight table based on the content of the current exposing image and the switched region of interest, controlling the exposing of the region of interest based on the weight table including:
    when the estimated illumination is normal, switching the default region of interest into the image central area and the side areas of the vehicle, assigning the weight value of the subject luminance evaluation in the current exposing image according to the content of current exposing image, the image central area and the side areas of the vehicle, generating a first weight table, controlling the exposing of the image central area and side areas of the vehicle based on the first weight table, the first weight table includes a first weight value corresponding to the image central area and side areas of the vehicle and a second weight value corresponding to the area below the image central region, the first weight value is higher than the second weight value;
    when the estimated illumination is low, switching the default region of interest into image central area, assigning the weight value of the subject luminance evaluation in the current exposing image and generating a second weight table according to the content of current exposing image and the image central area, controlling the exposing of the image central area based on the second weight table, the second weight table includes a third weight value corresponding to the image central area and a fourth weight value corresponding to the other areas, the third weight value is higher than the fourth weight value, the other areas are the areas besides the image central area.

5. The method of switching a region of interest according to claim 1, wherein the method further comprising:
    establishing and storing a correspondence relationship between the normal illuminance and the first weight table;
    establishing and storing a correspondence relationship between the low illuminance and the second weight table.

6. An apparatus of switching a region of interest, wherein the apparatus comprising:
    an image obtaining module, which is used for obtaining a frame of an image before exposure;
    an output obtaining module, which is used for outputting a luminance value of each partition of the image, the accumulation number of pixels lower than a first set threshold, accumulation number of pixels higher than a second set threshold, to generate an evaluation data;
    an eigenvalue generating module, which is used for generating eigenvalues of a plurality of illuminance evaluation areas based on the evaluation data and the preset illuminance evaluation area distribution table;
    an illuminance estimating module, which is used for estimating the illuminance of an environment of a vehicle according to the eigenvalues of the plurality of illuminance evaluation areas and differentiation characteristics between normal illuminance and low illuminance;

an exposing module, which is used for switching a region of interest of a current exposing image based on the estimating results, generating a weight table based on the content of the current exposing image and the switched region of interest, controlling the exposing of the region of interest based on the weight table.

7. The apparatus of switching a region of interest according to claim 6, wherein the plurality of illuminance evaluation areas including a front-side area, an image central area, and both side areas of the vehicle.

8. The apparatus of switching a region of interest according to claim 6, wherein the illuminance estimating module further including:

an estimating unit, which is used for estimating whether brightness ratios of the plurality of illumination evaluation areas are within a preset range or not;

a normal illuminance estimating unit, which is used for estimating the illumination of the environment in which the vehicle is located is normal when the brightness ratios of the plurality of illumination evaluation areas are within the preset range;

a low illuminance exposing unit, which is used for estimating the illumination of the environment in which the vehicle located is low when the brightness ratios of the plurality of illumination evaluation areas is not within the preset range while the average brightness of the front-side area is higher than the average brightness of the side areas of the vehicle;

wherein, the brightness ratios is the value of the high threshold illumination pixel accumulation number divided by the low threshold illumination pixel accumulation number;

wherein, the average brightness is the value of the pixels brightness divided by the pixels number.

9. The apparatus of switching a region of interest according to claim 6, wherein the exposing module including:

a first exposing unit, which is used for switching the default region of interest into the image central area and the side areas of the vehicle when the estimated illumination is normal, and assigning the weight value of the subject luminance evaluation in the current exposing image according to the content of current exposing image, the image central area and the side areas of the vehicle, generating a first weight table, exposing the image central area and side areas of the vehicle based on the first weight table, the first weight table includes a first weight value corresponding to the image central area and side areas of the vehicle and a second weight value corresponding to the area below the image central region, the first weight value is higher than the second weight value;

a second exposing unit, which is used for switching the default region of interest into image central area when the estimated illumination is low, and assigning the weight value of the subject luminance evaluation in the current exposing image and generating a second weight table according to the content of current exposing image and the image central area, exposing the image central area based on the second weight table, the second weight table includes a third weight value corresponding to the image central area and a fourth weight value corresponding to the other areas, the third weight value is higher than the fourth weight value, the other areas are the areas besides the image central area;

wherein, the first weight table includes a first weight value corresponding to the image central area and side areas of the vehicle and a second weight value corresponding to the area below the image central region, the first weight value is higher than the second weight value;

wherein, the second weight table includes a third weight value corresponding to the image central area and a fourth weight value corresponding to the other areas, the third weight value is higher than the fourth weight value, the other areas are the areas besides the image central area.

10. The apparatus of switching a region of interest according to claim 9, wherein the apparatus further including:

a first weight table configuring module, which is used for establishing and storing a correspondence relationship between the normal illuminance and the first weight table;

a second weight table configuring module, which is used for establishing and storing a correspondence relationship between the low illuminance and the second weight table.

* * * * *